(12) United States Patent
Song

(10) Patent No.: US 11,628,890 B2
(45) Date of Patent: Apr. 18, 2023

(54) FLOOR CONNECTION STRUCTURE OF VEHICLE UNDER BODY

(71) Applicants: Hyundai Motor Company, Seoul (KR); Kia Corporation, Seoul (KR)

(72) Inventor: Won Ki Song, Seongnam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 71 days.

(21) Appl. No.: 17/345,591

(22) Filed: Jun. 11, 2021

(65) Prior Publication Data
US 2022/0185388 A1    Jun. 16, 2022

(30) Foreign Application Priority Data
Dec. 16, 2020  (KR) .................. 10-2020-0176334

(51) Int. Cl.
*B62D 25/20*  (2006.01)
(52) U.S. Cl.
CPC ................. *B62D 25/2009* (2013.01)
(58) Field of Classification Search
CPC ........ B62D 25/2054; B62D 25/2009; B62D 25/20; B62D 25/2036; B62D 21/157; B62D 27/02

USPC .................................... 296/184.1, 193.07
See application file for complete search history.

(56) References Cited

U.S. PATENT DOCUMENTS

| | | | | |
|---|---|---|---|---|
| 5,403,063 A | * | 4/1995 | Sjostedt | B62D 33/046 52/630 |
| 5,501,289 A | * | 3/1996 | Nishikawa | H01M 50/20 280/783 |
| 6,688,674 B2 | * | 2/2004 | Sato | B62D 25/2009 296/29 |
| 2003/0005852 A1 | * | 1/2003 | Okamura | B61D 17/041 105/396 |
| 2018/0319352 A1 | * | 11/2018 | Kwon | B60R 13/01 |

* cited by examiner

*Primary Examiner* — Joseph D. Pape
*Assistant Examiner* — Veronica M Shull
(74) *Attorney, Agent, or Firm* — Slater Matsil, LLP

(57) ABSTRACT

An embodiment floor connection structure of a vehicle under body configured to connect a floor panel to side sills on both sides of the under body includes a plurality of box panels, each of the box panels including an opened portion and a closed portion, wherein the box panels are configured to be connected to each other along a vehicle width direction, and wherein a first box panel is coupled to a first side sill through the opened portion of the first box panel and a second box panel is coupled to a second side sill through the opened portion of the second box panel.

20 Claims, 8 Drawing Sheets

FLOOR CONNECTION STRUCTURE OF VEHICLE UNDER BODY

CROSS-REFERENCE TO RELATED APPLICATIONS

This application claims the benefit of Korean Patent Application No. 10-2020-0176334, filed on Dec. 16, 2020, which application is hereby incorporated herein by reference.

TECHNICAL FIELD

The present invention relates to a floor connection structure of a vehicle under body.

BACKGROUND

Recently, the vehicle industry has introduced a new concept of future mobility vision for realizing a dynamic human-centered city of the future. One of these future mobility solutions is a PBV (Purpose Built Vehicle) as a purpose-based mobility.

A PBV is an environment-friendly mobility solution that provides the customized service required for occupants during the time of travel from the origin to the destination, and based on electric vehicles, and using artificial intelligence, the PBV can set the optimal route for each situation and run in clusters.

The body of a PBV includes an under body (also referred to as a rolling chassis or skateboard in the industry) and an upper body mounted on the under body.

The center floor panel is connected between the dash panel on the front side and the rear floor panel on the under body. The center floor panel is a monocoque type in which a plurality of panel components are combined, and is coupled to both side sill inners of the under body.

However, in general, equipment investment and production cost increase by manufacturing panel parts having a plurality of cross-sections using a plurality of mold equipment, and assembling these panel parts corresponding to the overall length and width of the under body.

In general, during a side impact of a vehicle, as the impact load is concentrated on the side sills of the under body, the side impact performance may be deteriorated due to rotational deformation of the side sills.

The above information disclosed in this Background section is only for enhancement of understanding of the background of the invention, and therefore it may contain information that does not form the prior art that is already known to a person of ordinary skill in the art.

SUMMARY

The present invention relates to a floor connection structure of a vehicle under body. Particular embodiments relate to a floor connection structure of an under body for a PBV (Purpose Built Vehicle).

Embodiments of the present invention provide a floor connection structure of an under body for a vehicle which may be constructed with panel parts having a common cross-section.

A floor connection structure of a vehicle under body connecting a floor panel to side sills on both sides of the under body according to an exemplary embodiment of the present invention may include at least two box panels including an opened portion and a closed portion insertable into the opened portion, connected to each other along the vehicle width direction through the opened portion and the closed portion, and coupled to the side sill through the opened portion.

The floor connection structure according to an exemplary embodiment of the present invention may include a main assembly connected to a pair of the box panels through closed portions facing each other.

The floor connection structure according to an exemplary embodiment of the present invention may further include a sub assembly in which the rest of the box panels connected to each other through the opened portion and the closed portion are connected to the opened portion of the main assembly.

In the sub-assembly, a connection flange connected to a side sill inner may be formed in the opened portion of the outermost box panel corresponding to the side sill.

In the main assembly, the closed portions of the box panels facing each other may be joined in the vehicle width direction.

The box panels may include a cross-section of a "U" shape, be connected to each other and joined to the side sill, and have a closed section of a rectangular shape.

The height of the opened portion of the box panel may be larger than the height of the closed portion.

The closed portion of the box panel may include a joggle step that is stepped from the opened portion, and may be formed with a lower height than the opened portion by the joggle step.

On the upper surface of the closed portions facing each other in the main assembly, a rib seating portion, where a rib of a carpet is fitted, may be formed by the joggle step.

The opened portion of the box panel may include a connection flange connected to an inner surface of a side sill inner in the vehicle width direction.

The opened portion of the box panel may include a connection flange that is joined in up and down directions on upper and lower surfaces of a side sill inner.

The opened portion of the box panel may include a slant surface with a cross-section whose height decreases along the direction of the closed portion at the connection flange.

According to embodiments of the present invention, since a floor capable of responding to the overall length and width of multiple vehicle types can be configured through the cross-section of the box panels, it is possible to reduce the investment cost and production cost of mold equipment.

In addition, the effect obtained or predicted by an exemplary embodiment of the present invention will be disclosed directly or implicitly in the detailed description of exemplary embodiments of the present invention. That is, various effects predicted according to exemplary embodiments of the present invention will be disclosed within a detailed description to be described later.

BRIEF DESCRIPTION OF THE DRAWINGS

These drawings are for reference only in describing exemplary embodiments of the present invention, and therefore, the technical idea of the present invention should not be construed as being limited to the accompanying drawings.

Figure 1:
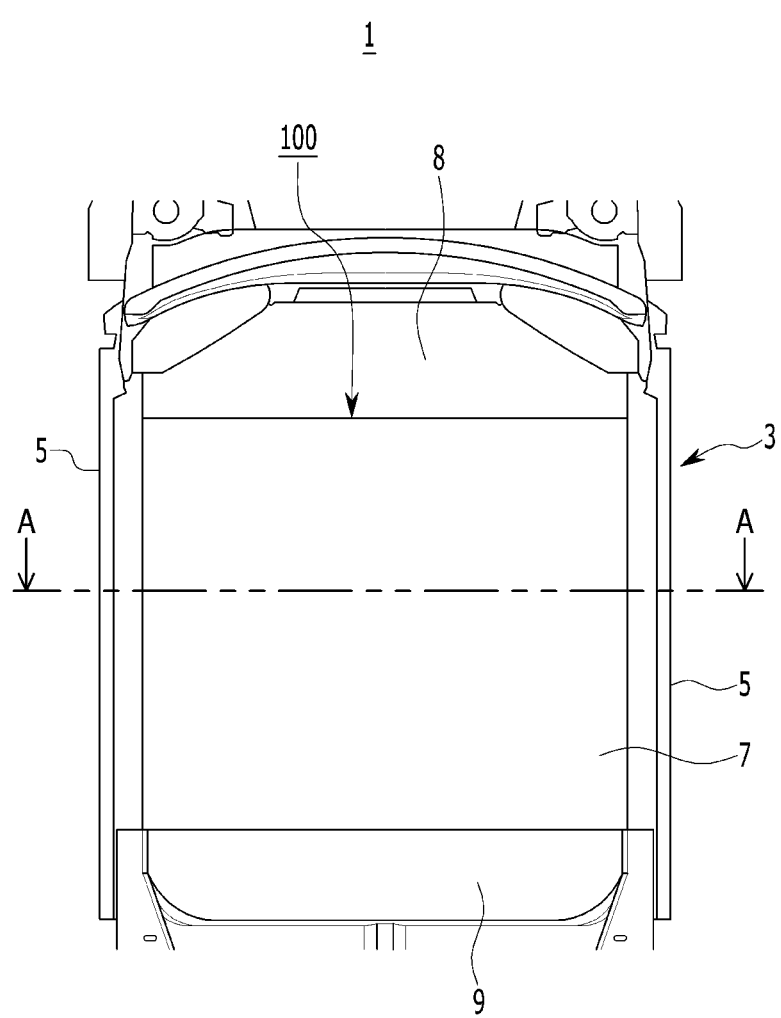
FIG. 1 is a drawing showing an under body of a vehicle applicable to an exemplary embodiment of the present invention.

The following elements may be used in connection with the drawings to describe embodiments of the present invention.

| | |
|---|---|
| 1: under body | 3: chassis frame |
| 5: side sill | 6: side sill inner |
| 7: center floor panel | 8: dash panel |
| 9: rear floor panel | 10: box panel |
| 11: opened portion | 12a, 14a: upper surface |
| 12b, 14b: lower surface | 13: closed portion |
| 14c: side surface | 15: opening |
| 17: joggle | 19: closed section |
| 30: main assembly | 33: rib seating portion |
| 50: sub assembly | 60: spot welding gun |
| 71: carpet | 73: rib |
| 81, 91: connection flange | 93: slant surface |
| h1, h2: height | 100, 200, 300: floor connection structure |

DETAILED DESCRIPTION OF ILLUSTRATIVE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In order to clearly describe embodiments of the present invention, parts irrelevant to the description are omitted, and the same reference numerals are attached to the same or similar components throughout the specification.

Since the size and thickness of each component shown in the drawings are shown arbitrarily for convenience of explanation, the present invention is not necessarily limited to what is shown in the drawings, and the thickness is enlarged to clearly express various parts and areas.

In addition, in the following detailed description, the names of the configurations are divided into first, second, etc. to distinguish the configurations in the same relationship, and are not necessarily limited to the order in the following description.

Throughout the specification, when a part includes a certain component, it means that other components may be further included rather than excluding other components unless specifically stated to the contrary.

In addition, terms such as . . . unit, . . . means, etc. described in the specification mean a unit of a comprehensive structure that performs at least one function or operation.

FIG. 1 is a drawing showing an under body of a vehicle applicable to an exemplary embodiment of the present invention.

Referring to FIG. 1, a floor connection structure 100 of the under body for a vehicle according to an exemplary embodiment of the present invention may be applied to, for example, a Purpose Built Vehicle (PBV) based on an electric vehicle.

Here, the PBV is an environment-friendly mobile vehicle that provides an occupant with a necessary customized service during the time it travels from the origin to the destination. The PBV is capable of setting an optimal route for each situation and driving in a cluster, and further, may be a box-type design vehicle having a large indoor space.

Such a PBV includes a skateboard type under body 1 and an upper body (not shown in the drawing) as a monocoque type vehicle body mounted on the under body 1.

The under body 1 is also referred to as a rolling chassis in the industry, and includes a chassis frame 3 on which a battery assembly (not shown in the drawing) can be mounted. And, the upper body is a body that is coupled to the under body 1, and can constitute a cabin. The upper body may be, for example, a space frame formed by connecting a plurality of members such as a steel plate or a pipe to form a skeleton.

In the industry, the vehicle width direction is referred to as the L direction, the length direction of the vehicle body (the front-rear direction or the overall length direction) is the T direction, and the height direction of the vehicle body is called the H direction. However, in an embodiment of the present invention, instead of setting the LTH direction as the reference direction as described above, the components will be described below by setting the vehicle width direction, the vehicle body front-rear direction, and the vertical direction.

Furthermore, the end (one/one end or the other/one end) in the following may be defined as either end and a certain portion (one/one end or the other/one end) including the end.

An exemplary embodiment of the present invention is applied to the under body 1, and a center floor panel 7 is coupled to side sills 5 on both sides of the vehicle width direction in a chassis frame 3. Here, a dash panel 8 is connected to the front part of the center floor panel 7 and a rear floor panel 9 is connected to the rear part of the center floor panel 7.

Hereinafter, as the floor connection structure 100 of the under body for a vehicle according to an exemplary embodiment of the present invention, a connection structure of the center floor panel 7 coupled to the side sills 5 on both sides of the under body 1 will be described.

In an exemplary embodiment of the present invention, the floor connection structure 100 of the under body for a vehicle constitutes a center floor panel 7 with panel parts having a common cross-section, and a floor that can respond to the overall length and width of various vehicle types.

Figure 2:
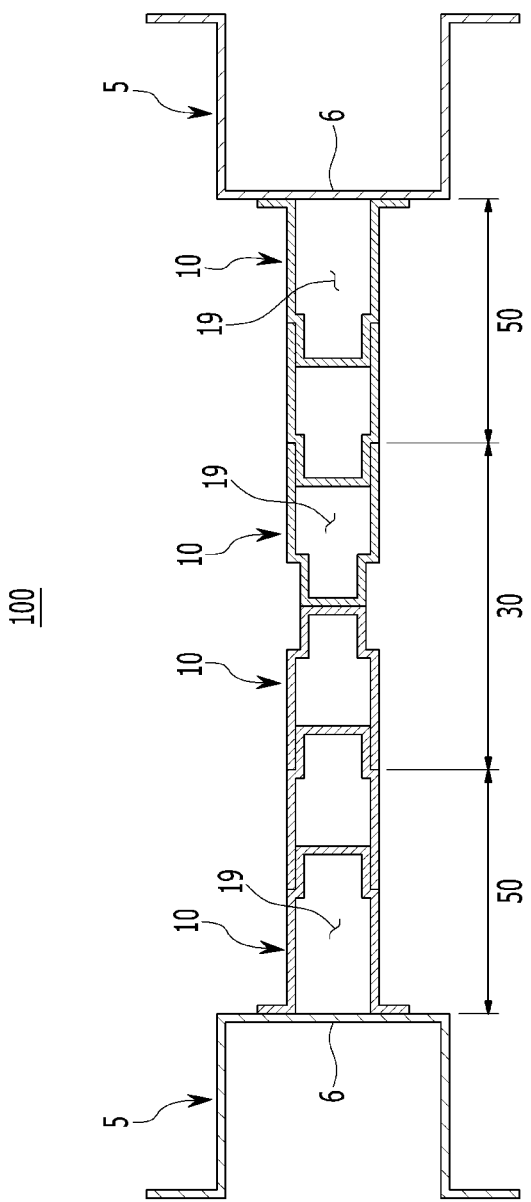
FIG. 2 is a cross-sectional view along line A-A of FIG. 1.

FIG. 2 is a cross-sectional view along line A-A of FIG. 1.

Referring to FIG. 2, the floor connection structure 100 of the under body for a vehicle according to an exemplary embodiment of the present invention includes at least two box panels 10 as a main assembly 30 and a sub assembly 50.

In an exemplary embodiment of the present invention, the box panels 10 constitute the center floor panel 7 as shown in FIG. 1, and are provided in plural. The box panels 10 are provided in the shape of an open box in one direction in which one side is open. For example, these box panels 10 may have a "U" shape cross-section with top, bottom and side surfaces.

As shown in FIG. 1, the box panels 10 are disposed between the dash panel 8 and the rear floor panel 9 of the under body 1 in the front and rear direction of the vehicle body, connected to each other along the vehicle width direction, and coupled to the side sills 5.

Figure 3:
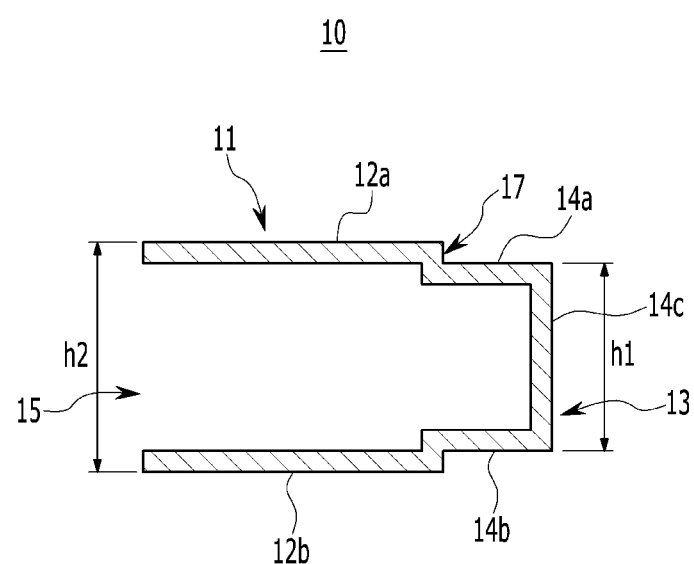
FIG. 3 is a drawing showing a box panel applied to the floor connection structure of the under body for a vehicle according to an exemplary embodiment of the present invention.

FIG. 3 is a drawing showing a box panel applied to the floor connection structure of the under body for a vehicle according to an exemplary embodiment of the present invention.

Referring to FIG. 2 and FIG. 3, the box panels 10 include an opened portion 11 formed on one side along the vehicle width direction and a closed portion 13 formed on the other side along the vehicle width direction.

The opened portion 11 includes an upper surface 12a and a lower surface 12b, and an opening 15 is formed between the upper surface 12a and the lower surface 12b along the vehicle width direction.

The closed portion 13 includes an upper surface 14a and a lower surface 14b integrally connected to the opened portion 11 and a side surface 14c connecting the upper surface 14a and the lower surface 14b.

The closed portion 13 of one box panel 10 may be inserted into the opened portion 11 of any other box panel 10 through the upper surface 14a, lower surface 14b and side surface 14c. The opened portion 11 of the box panel 10 is formed with a height h2 that is greater than the height h1 of the closed portion 13.

The closed portion 13 includes a joggle step 17 that is stepped from the opened portion 11. The joggle step 17 may be formed by a method of molding by giving a step to a part of the plate. Accordingly, the closed portion 13 may be formed with a lower height than the opened portion 11 by the joggle step 17.

The box panels 10 as described above are connected to each other along the vehicle width direction through the opened portion 11 and the closed portion 13, and may be coupled to a side sill inner 6 of the side sill 5 through the opened portion 11.

The box panels 10 have a cross-section with the "U" shape, and as the box panels 10 are connected to each other along the vehicle width direction through the opened portion 11 and the closed portion 13, a closed section 19 with an approximately rectangular shape may be formed between the side sill inners 6.

The connection structure of these box panels 10 and the connection structure of the box panel 10 and the side sill inner 6 will be described in more detail later.

In an exemplary embodiment of the present invention, the main assembly 30 is provided as an assembly in which a pair of box panels 10 are connected to each other through the closed portions 13 facing each other. The main assembly 30 may be provided as a reference assembly positioned at the center portion in the entire center floor area, as shown in the drawing.

Figure 4:
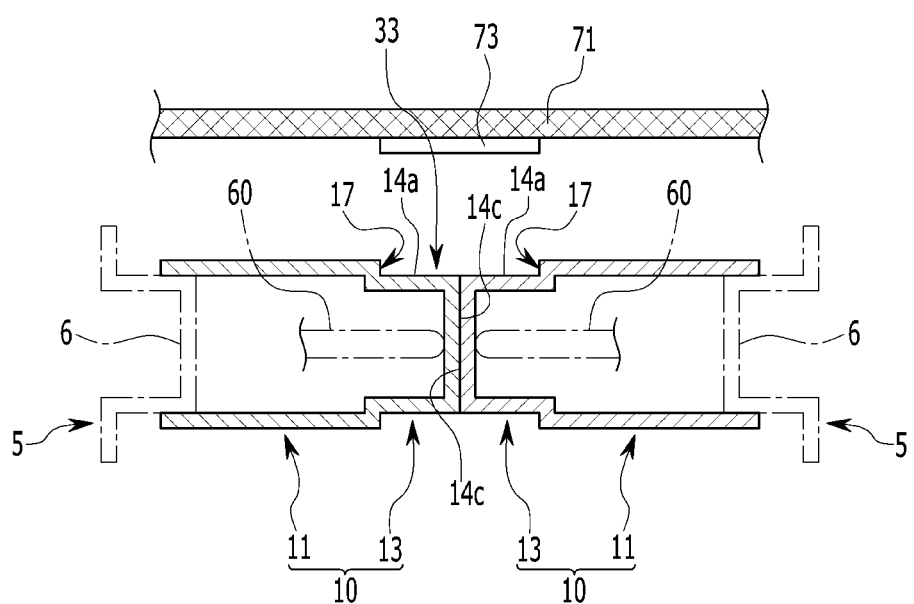
FIG. 4 is a drawing showing a main assembly applied to the floor connection structure of the under body for a vehicle according to an exemplary embodiment of the present invention.

FIG. 4 is a drawing showing a main assembly applied to the floor connection structure of the under body for a vehicle according to an exemplary embodiment of the present invention.

As an alternative, the main assembly 30 including a pair of box panels 10 facing each other and connected to each other through a closed portion 13 may constitute the entire center floor panel 7 (referring to FIG. 1), and the opened portion 11 may also be connected to the side sill inner 6. However, hereinafter, an example in which the main assembly 30 is positioned at the center portion of the center floor panel 7 will be described.

In this main assembly 30, as shown in FIG. 4, a pair of box panels 10 are disposed to face each other along the vehicle width direction through the closed portion 13. That is, the closed portion 13 of the box panels 10 are disposed to face each other along the vehicle width direction through the side surface 14c. In this way, the side surfaces 14c of the closed portions 13 facing each other are joined in the vehicle width direction.

Here, the side surfaces 14c of the closed portions 13 facing each other are joined by spot welding through a spot welding gun 6o. In this case, the spot welding gun 60 enters the inside of the closed portion 13 through the opened portion 11 opened in the opposite direction along the vehicle width direction, and the side surfaces 14c of the closed portions 13 facing each other are spot welded along the vehicle width direction.

Furthermore, as the closed portions 13 facing each other of the box panels 10 are joined to each other as described above, a rib 73 protruded to the bottom surface of a carpet 71 is fitted to the upper surface 14a of the closed portions 13. A rib groove 33 into which the rib 73 protruding from the bottom surface of the carpet 71 is fitted may be formed in the upper surface 14a of the closed portions 13 by the joggle step 17.

Figure 5:
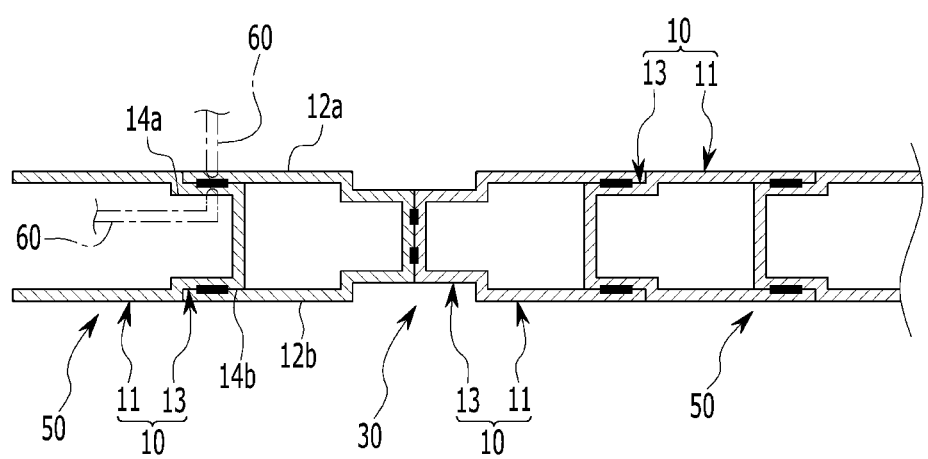
FIG. 5 is a drawing showing a sub-assembly applied to the floor connection structure of the under body for a vehicle according to an exemplary embodiment of the present invention.

FIG. 5 is a drawing showing a sub-assembly applied to the floor connection structure of the under body for a vehicle according to an exemplary embodiment of the present invention.

Referring to FIG. 2 to FIG. 5, in an exemplary embodiment of the present invention, the sub assembly 50 may be formed of box panels 10 connected to each other through the opened portion 11 and the closed portion 13. It may also consist of a box panel 10 connected to the opened portion 11 of the assembly 30. That is, the sub assembly 50 may be connected to both sides of the main assembly 30 along the vehicle width direction with the main assembly 30 interposed therebetween.

The box panels 10 of the sub assembly 50 are inserted into the opened portions 11 on both sides of the main assembly 30 through the closed portion 13. In addition, the box panels 10 of the sub assembly 50 are inserted into the opened portion 11 through the closed portion 13, and can be disposed in the vehicle width direction.

In the state where the closed portion 13 is inserted into the opened portion 11 as described above, the upper surface 12a and the lower surface 12b of the opened portion 11 and the upper surface 14a and the lower surface 14b of the closed portion 13 are spot welded through the spot welding gun 60.

In this case, the spot welding gun 60 enters the inside of the closed portion 13 through the opened portion 11, and the upper surface 12a of the opened portion 11 and the upper surface 14a of the closed portion 13 and the lower surface 12b of the opened portion 11 and the lower surface 14b of the closed portion 13 can be spot welded along the up and down directions.

Figure 6:
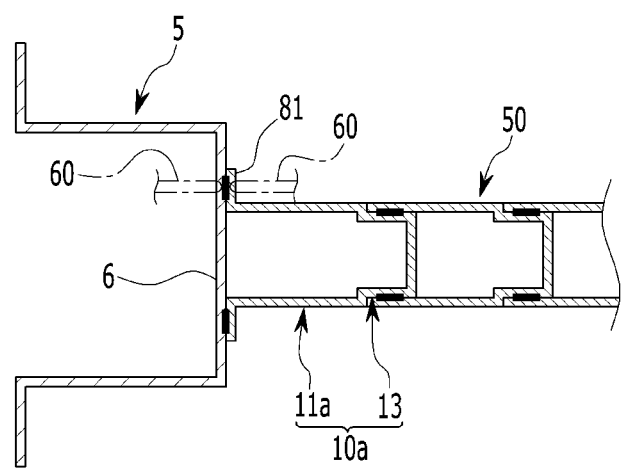
FIG. 6 is a drawing showing a combination of a box panel and a side sill applied to the floor connection structure of an under body for a vehicle according to an exemplary embodiment of the present invention.

FIG. 6 is a drawing showing a combination of a box panel and a side sill applied to the floor connection structure of an under body for a vehicle according to an exemplary embodiment of the present invention.

In the sub assembly 50 as described above, an opened portion 11a of an outermost box panel 10a is coupled to the side sill inner 6 of the side sill 5. The opened portion 11*a* includes a connection flange 81 that is joined to the inner surface of the side sill inner 6.

The connection flange 81 is joined by spot welding along the vehicle width direction to the inner surface of the side sill inner 6 through the spot welding gun 60. In the above, the spot welding gun 60 enters the inner side of the side sill inner 6, and the inner surface of the side sill inner 6 and the connection flange 81 may be spot welded in the vehicle width direction.

Hereinafter, an assembly process for the floor connection structure 100 of the under body for a vehicle according to an exemplary embodiment of the present invention configured as described above will be described in detail with reference to the drawings disclosed above.

In an exemplary embodiment of the present invention, a pair of box panels 10 are disposed to face each other along the vehicle width direction through the closed portion 13. Then, in an exemplary embodiment of the present invention, the side surfaces 14*c* of the closed portions 13 facing each other are spot welded in the vehicle width direction, and the main assembly 30 is assembled.

Subsequently, in an exemplary embodiment of the present invention, the closed portions 13 of other box panels 10 are inserted into the opened portions 11 on both sides of the main assembly 30. Thereafter, in an exemplary embodiment of the present invention, the closed portion 13 of further box panels 10 are inserted into the opened portions 11 of the other box panels 10 described above, and in this way, the main assembly 30 is interposed between the box panels 10.

Next, in an exemplary embodiment of the present invention, the upper surface 12*a* of the opened portion 11 and the upper surface 14*a* of the closed portion 13 and the lower surface 12*b* of the opened portion 11 and the lower surface 14*b* of the closed portion 13 overlapped with each other are spot welded in the up and down directions. That is, the sub assembly 50 is assembled on both sides of the main assembly 30 along the vehicle width direction.

The operation may be additionally performed according to the length of the box panel 10 and the vehicle width length.

Then, in an exemplary embodiment of the present invention, the opened portion 11 of the box panel 10*a* positioned on the outermost side of the sub assembly 50 is joined to the side sill inner 6 of the side sill 5. In this process, the inner surface of the side sill inner 6 and the connection flange 81 are spot-welded in the vehicle width direction.

Therefore, in an exemplary embodiment of the present invention, the box panels 10 having a common cross-section of at least one element are connected to each other through a series of assembly processes as described above, and the center floor panel 7 of the under body 1 is formed.

According to the floor connection structure 100 of the underbody for a vehicle according to embodiments of the present invention as described so far, it is possible to configure a floor that can respond to the overall length and width of multiple vehicle types through the common cross-section of the box panels 10. And thus, it is possible to reduce the investment cost and production cost of the mold equipment and the like.

In addition, in the embodiments of the present invention, since the closed sections 19 having a rectangular shape are formed along the vehicle width direction in the box panels 10 connected to each other, the strength and rigidity of the floor can be improved.

Figure 7:
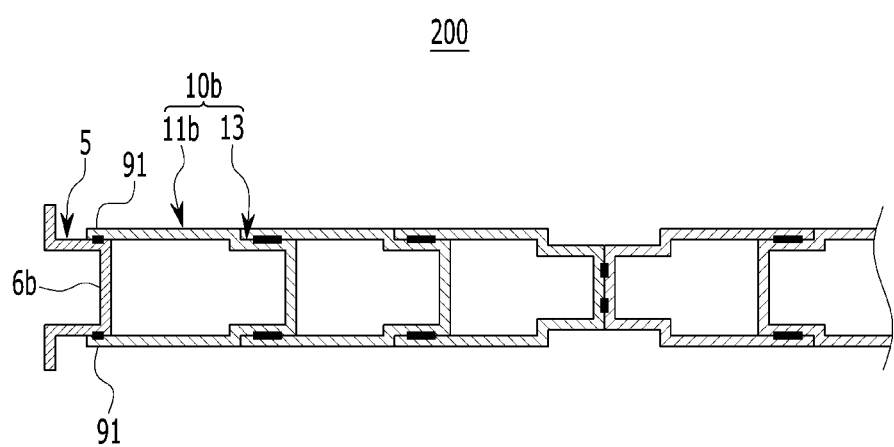
FIG. 7 is a cross-sectional view showing a floor connection structure of an under body for a vehicle according to another exemplary embodiment of the present invention.

FIG. 7 is a cross-sectional view showing a floor connection structure of an under body for a vehicle according to another exemplary embodiment of the present invention.

For convenience of understanding, in the drawings, the same reference numerals are assigned to the same components as those of the previous embodiment.

Referring to FIG. 7, a floor connection structure 200 of the under body for a vehicle according to another exemplary embodiment of the present invention is based on the structure of the previous exemplary embodiment. In addition, a box panel 10*b* positioned on the outermost side may include an opened portion 11*b* in which a connection flange 91 is formed to be joined to the upper and lower surfaces of a side sill inner 6*b* in the vertical direction.

The box panel 10*b* is a panel that is bonded to the side sill inner 6*b*, and the connection flange 91 is integrally formed in the opened portion 11*b* of the box panel 10*b*. The connection flange 91 overlaps the upper and lower surfaces of the side sill inner 6*b*, and can be joined along the up and down directions by spot welding.

Therefore, in another exemplary embodiment of the present invention, when a vehicle's side surface collides, it absorbs and distributes the collision load concentrated on the side sill 5, and minimizes the rotational deformation of the side sill 5, thereby reducing the damage of the battery assembly and the injury of the occupant.

The remaining configuration and effect of the floor connection structure 200 of the under body for a vehicle according to embodiments of the present invention as described above are the same as those of the previous exemplary embodiment, so a detailed description will be omitted.

Figure 8:
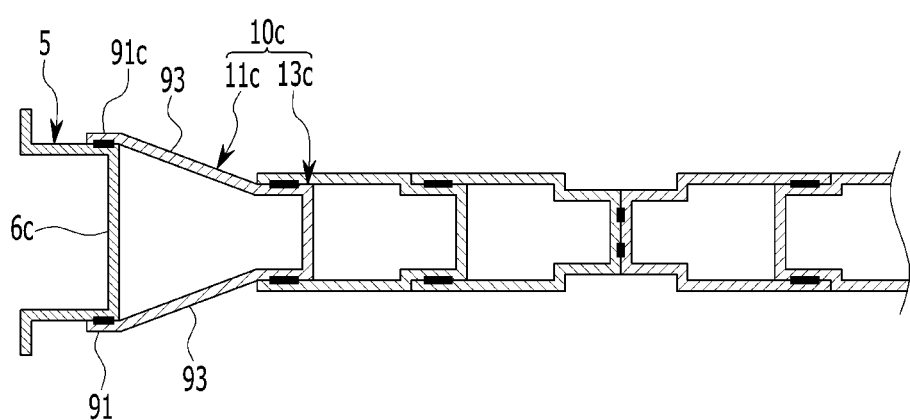
FIG. 8 is a cross-sectional view showing a floor connection structure of an under body for a vehicle according to another exemplary embodiment of the present invention.

FIG. 8 is a cross-sectional view showing a floor connection structure of an under body for a vehicle according to another exemplary embodiment of the present invention.

For convenience of understanding, in the drawings, the same reference numerals are assigned to the same components as those of the previous embodiment.

Referring to FIG. 8, a floor connection structure 300 of the under body for a vehicle according to another exemplary embodiment of the present invention is based on the structure of the previous exemplary embodiments. In addition, a box panel 10*c* may include an opened portion 11*c* of the box panel 10*c* having a slant surface 93 inclined toward a closed portion 13*c* from a connection flange 91*c* joined in the up and down directions on upper and lower surfaces of a side sill inner 6*c*.

The box panel 10*c* is a panel bonded to the side sill inner 6*c*, and the flange 91*c* and the slant surface 93 may be integrally formed on the opened portion 11*c* of the box panel 10*c*. In the above, the slant surface 93 may be formed in a cross-section shape whose height gradually decreases from the connection flange 91*c* to the closed portion 13*c*.

Therefore, in another exemplary embodiment of the present invention, when a side surface of a vehicle collides, the collision load concentrated on the side sill 5 is absorbed and distributed through the slant surface 93, and the side surface collision performance of the vehicle can be further improved.

Since the remaining configuration and effect of the floor connection structure 300 of the vehicle under body according to another exemplary embodiment of the present invention as described above are the same as those of the previous exemplary embodiments, a detailed description will be omitted.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A floor connection structure of a vehicle under body configured to connect a floor panel to side sills on both sides of the under body, the floor connection structure comprising: a plurality of box panels, each of the box panels including an opened portion and a closed portion, wherein the box panels are configured to be connected to each other along a vehicle width direction, wherein a first box panel is coupled to a first side sill through the opened portion of the first box panel and a second box panel is coupled to a second side sill through the opened portion of the second box panel, wherein each of the box panels has a "U" shaped cross-section, and wherein the box panels are connected to each other and joined to the side sills, and have a closed section of a rectangular shape.

2. The floor connection structure of claim 1, further comprising a main assembly comprising a third box panel and a fourth box panel disposed with the closed portions of each facing each other and connected to each other.

3. The floor connection structure of claim 2, further comprising a sub assembly comprising a fifth box panel disposed between the first box panel and the third box panel, wherein the closed portion of the fifth box panel is connected to the opened portion of the third box panel of the main assembly and the opened portion of the fifth box panel is connected to the closed portion of the first box panel.

4. The floor connection structure of claim 3, further comprising a connection flange in the opened portion of the first box panel and connected to a side sill inner corresponding to the first side sill.

5. The floor connection structure of claim 2, wherein the closed portions of the third box panel and the fourth box panel are joined in the vehicle width direction.

6. The floor connection structure of claim 2, wherein:
the closed portion of the third box panel includes a first joggle step that is stepped from the opened portion and has a lower height than the opened portion by the first joggle step;
the closed portion of the fourth box panel includes a second joggle step that is stepped from the opened portion and has a lower height than the opened portion by the second joggle step;
a rib seating portion is formed by the first joggle step and the second joggle step; and
a rib of a carpet is fitted in the rib seating portion.

7. The floor connection structure of claim 1, wherein a height of the opened portion of each box panel is larger than a height of the closed portion.

8. The floor connection structure of claim 1, wherein the closed portion of each box panel includes a joggle step that is stepped from the opened portion and has a lower height than the opened portion by the joggle step.

9. The floor connection structure of claim 1, wherein the opened portion of the first box panel includes a connection flange connected to an inner surface of a side sill inner in the vehicle width direction.

10. The floor connection structure of claim 1, wherein the opened portion of the first box panel includes a connection flange that is joined on upper and lower surfaces of a side sill inner.

11. The floor connection structure of claim 10, wherein the opened portion of the first box panel includes a slant surface with a cross-section whose height decreases along a direction of the closed portion at the connection flange.

12. A floor connection structure of a vehicle under body, the floor connection structure comprising:
a first box panel and a second box panel each including an opened portion and a closed portion, wherein the closed portion of the first box panel and the closed portion of the second box panel face each other and are connected to each other along a vehicle width direction, wherein the first box panel is coupled to a first side sill through the opened portion of the first box pane, and wherein the second box panel is coupled to a second side sill through the opened portion of the second box panel;
a first connection flange in the opened portion of the first box panel and connected to a first side sill inner corresponding to the first side sill; and
a second connection flange in the opened portion of the second box panel and connected to a second side sill inner corresponding to the second side sill.

13. The floor connection structure of claim 12, wherein:
an upper surface of the closed portion of the first box panel includes a first joggle step stepped from the opened portion and having a lower height than the opened portion by the first joggle step;
an upper surface of the closed portion of the second box panel includes a second joggle step stepped from the opened portion and having a lower height than the opened portion by the second joggle step; and
the first joggle step and the second joggle step form a rib seating portion.

14. The floor connection structure of claim 13, further comprising a rib of a carpet fitted in the rib seating portion.

15. A vehicle under body comprising:
a dash panel;
a rear floor panel;
a center floor panel disposed between the dash panel and the rear floor panel in a front and rear direction of the vehicle under body, wherein the center floor panel comprises a plurality of box panels, each of the box panels including an opened portion and a closed portion, wherein the box panels are connected to each other along a vehicle width direction, and wherein a first box panel is coupled to a first side sill through the opened portion of the first box panel and a second box panel is coupled to a second side sill through the opened portion of the second box panel; and
a third box panel and a fourth box panel disposed with the closed portions of each facing each other and connected to each other, wherein the third box panel and the fourth box panel are disposed between the first box panel and the second box panel in the vehicle width direction.

16. The vehicle under body of claim 15, further comprising:
a fifth box panel disposed between the first box panel and the third box panel, wherein the closed portion of the fifth box panel is connected to the opened portion of the third box panel and the opened portion of the fifth box panel is connected to the closed portion of the first box panel; and
a sixth box panel disposed between the fourth box panel and the second box panel, wherein the closed portion of the sixth box panel is connected to the opened portion of the fourth box panel and the opened portion of the sixth box panel is connected to the closed portion of the second box panel.

17. The vehicle under body of claim 15, wherein each of the box panels has a "U" shaped cross-section, and wherein the box panels are connected to each other and joined to the side sills, and have a closed section of a rectangular shape.

18. The vehicle under body of claim 15, wherein a height of the opened portion of each box panel is larger than a height of the closed portion.

19. The vehicle under body of claim 15, wherein the opened portion of the first box panel includes a connection flange that is joined on upper and lower surfaces of a side sill inner.

20. The vehicle under body of claim 19, wherein the opened portion of the first box panel includes a slant surface with a cross-section whose height decreases along a direction of the closed portion at the connection flange.

* * * * *